(12) United States Patent
Wilfert et al.

(10) Patent No.: US 6,236,562 B1
(45) Date of Patent: May 22, 2001

(54) SECTION OF A HIGH-VOLTAGE SYSTEM HAVING COOLING MEANS AND INCLUDING A CONDUCTOR

(75) Inventors: Günter Wilfert, Valley (DE); Günter Kübler, Zollikerberg; Sacha Parneix, Zürich, both of (CH); Enrico Malfa, Zanica (IT)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/470,963

(22) Filed: Dec. 23, 1999

(30) Foreign Application Priority Data

Dec. 24, 1998 (EP) .................................................. 98811265

(51) Int. Cl.$^7$ ............................ H01H 33/00; H02B 1/00; H02G 5/10; H05K 7/20
(52) U.S. Cl. ............................ 361/676; 174/16.2; 218/43; 218/44; 218/83
(58) Field of Search .................................. 174/15.1, 15.2, 174/15.6, 16.1, 16.2; 200/289; 218/43, 44, 51, 83, 75, 155–158; 361/600, 601, 676–678

(56) References Cited

U.S. PATENT DOCUMENTS

| | | | |
|---|---|---|---|
| 3,230,293 | 1/1966 | Turgeon | 174/16.2 |
| 3,364,838 | 1/1968 | Bradley | 312/213 |
| 4,378,461 * | 3/1983 | Haginomori | 174/16.2 |

FOREIGN PATENT DOCUMENTS 664 852    3/1988    (CH) ............................ H02B/13/00

* cited by examiner

Primary Examiner—J. R. Scott
(74) Attorney, Agent, or Firm—Burns, Doane, Swecker & Mathis, L.L.P.

(57) ABSTRACT

The section of an electrical high-voltage system has a gas-filled housing of predominantly symmetrical design. Provided in the housing are a conductor extending along a plane of symmetry of the housing, and cooling means for producing a circulation flow which dissipates heat loss from the conductor. The cooling means contains two blowers. The blowers are arranged in the interior of the housing and designed in such a way that, during the operation of the system, two mirror-symmetrical circulation part flows are formed which are bounded by the plane of symmetry. These circulation part flows are in each case guided without recirculation along a housing side wall from the top of the housing or the bottom of the housing. By this means, the heat loss is given up particularly effectively to the housing side walls, and the conductor can be loaded with very high operating currents.

12 Claims, 5 Drawing Sheets

SECTION OF A HIGH-VOLTAGE SYSTEM HAVING COOLING MEANS AND INCLUDING A CONDUCTOR

FIELD OF THE INVENTION

The invention relates to a section of an electrical high-voltage system. This system is suitable for transmitting high electrical power in the megawatt to gigawatt range. The currents and voltages occurring here lie in the kA and kV range, respectively. A typical system includes multi-phase generator output lines, in which in the individual phases, operating currents between 5 and 30 kA and operating voltages of, for example, 15 or 21 kV occur. Such a high-voltage system has sections in which considerable heating occurs as a result of relatively high power losses. Sections in which the current is led through a contact transition, for example a switching point, are subject to considerable heating. Such switching points are generally generator switches.

BACKGROUND OF THE INVENTION

Generator switches are usually cooled via natural convection and radiation. If such switches are of unencapsulated design, then the power loss of the conductor is transmitted in the form of heat to an extinction-chamber insulator which contains the contact arrangement of the switch and has cooling ribs led vertically. The heat absorbed by the extinction-chamber insulator is dissipated to the surroundings by convection and radiation. Such generator switches are marketed by ABB High Voltage Technologies Ltd, Zurich/Switzerland under the type designation HEI 1 . . . HEI 5. Furthermore, the abovementioned company also markets generator switches, with the type designation HEC3/HEC4, in which the conductor and the extinction-chamber insulator are arranged in a housing filled with an insulating gas, in particular with air. The heat formed in the conductor and predominantly led to the extinction-chamber insulator is then given up to the housing via natural convection and radiation. In this case, the heat is given up as a result of the temperature differences which become established between the conductor or extinction-chamber insulator the and housing. The heat absorbed by the housing is led off to the surroundings via natural convection and radiation because of the temperature difference between the housing and the surroundings. The heat flow in such a system is automatically established, depends primarily on geometrical dimensions and the materials and surface configurations used and is limited by the mechanisms of heat dissipation. If the generator switch is of threephase design, the three phases being arranged beside one another, the housing of the phase arranged in the center always has the highest temperatures, since the side walls cannot give up any radiation energy, and then has to be cooled particularly intensively.

SUMMARY OF THE INVENTION

The object is therefore set on providing a section for a high-voltage system having cooling means which is of the simplest possible construction and nevertheless permits a considerable increase in the system current without changing the geometric dimensions of the system.

According to the invention, the section of the high-voltage system, preferably designed as a generator switch, has as its cooling means at least one flow source arranged in the interior of the housing and designed in such a way that, during the operation of the system, two mirror-symmetrical circulation part flows are formed which are bounded by the plane of symmetry and which are in each case guided without recirculation along a first housing wall from a second housing wall, which is intersected by the plane of symmetry, to a third housing wall, which is intersected by the plane of symmetry. As a result of these measures, the transfer of heat from the conductor to the housing is increased, and therefore a limiting temperature on the conductor is not exceeded, the said temperature being determined by the insulation classes of the insulators holding the conductor.

Particularly efficacious heat transfer to the housing is achieved if flow sources are provided, each of which is assigned to one of the two circulation part flows. In this case, the plane of symmetry is preferably aligned predominantly vertically. The first housing wall is then a side wall, the second housing wall is a top and the third housing wall is a bottom of the housing. If the two flow sources are then fixed to opposite ends of the bottom of the housing and if the side wall coming from the respective end then has flow guide surfaces, the circulation part flows then extend in the same way as natural convection, and particularly sparingly dimensioned flow sources are then adequate. In this case, the flow guide surfaces reaching into the side walls prevent or reduce any recirculation of the circulation part flows, and thus improve the dissipation of heat from the conductor to the housing quite significantly.

The flow sources can also be fixed to the opposite ends of the top of the housing or the bottom of the housing, without the use of flow guide surfaces. In order to ensure that the two circulation part flows extend without recirculation, the two flow sources should then be arranged either on the bottom of the housing and then produce a flow which rises at the side walls and is directed counter to natural convection, or should be arranged on the top of the housing and then produce a flow which falls at the side walls and which supports the natural convection in a manner which is particularly advantageous in terms of energy.

If the section of the system has at least three housings which each accommodate a conductor and which are arranged with their housing side walls beside one another and at a distance from one another, forming vertically aligned channels, then the flow sources should be provided in the central housing of the three. The heat led to the housing side walls by the circulation part flows can then be led away by the chimney effect of the two channels. This chimney effect can be assisted by one or more flow sources fitted outside the housing.

It is preferable if, in at least one of the channels, there is arranged an intermediate wall, parallel to the bounding side walls of this channel. This intermediate wall picks up radiation energy from the side walls surrounding the channel, and this energy can then be removed from the channel as a result of the chimney effect. At the same time, the intermediate wall reduces the volume flow and hence the capacity of the flow sources located on the outside. The channel should have a width such that the volume flow led through the channel is not interfered with, with or without the intermediate wall, and the air forming the said volume flow is not heated up too severely.

Particularly good dissipation of heat from the intermediate wall to the air stream, which rises as a result of convection and/or the additional flow sources, is achieved by means which are moulded into the intermediate wall in order to enlarge its surface area. Such means can comprise corrugations which are led vertically and/or longitudinal ribs, but can also comprise a further intermediate wall led parallel to the intermediate wall, which in a particularly advantageous way can be connected to the intermediate wall by longitudinal ribs led vertically.

BRIEF DESCRIPTION OF THE DRAWINGS

Further advantages and applications of the invention emerge from the description which now follows, with reference to the figures, in which.

DETAILED DESCRIPTION OF THE PREFERRED EMBODIMENTS

Figure 1:
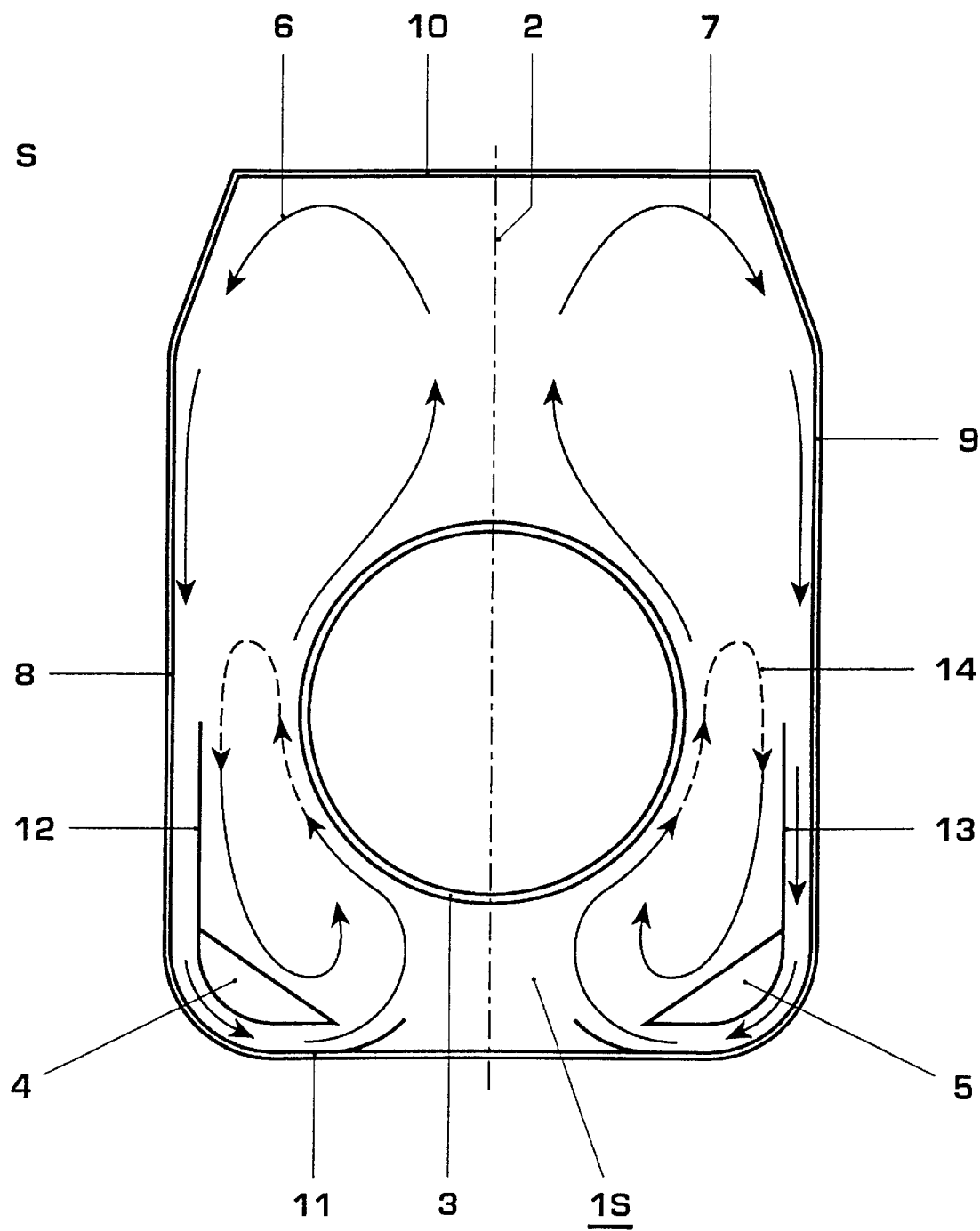
FIGS. 1 to 3 each show a view of a section, 10 made transversely with respect to the conductor, through three sections designed according to the invention of a high-voltage system of single-phase design, FIGS. 4 and 5 each show a view of a section, made transversely with respect to the conductors, through two sections designed according to the invention of a high-voltage system of three-phase design, and FIGS. 6 to 8 each show a plan view of the section of the system according to FIG. 4.
Figure 2:
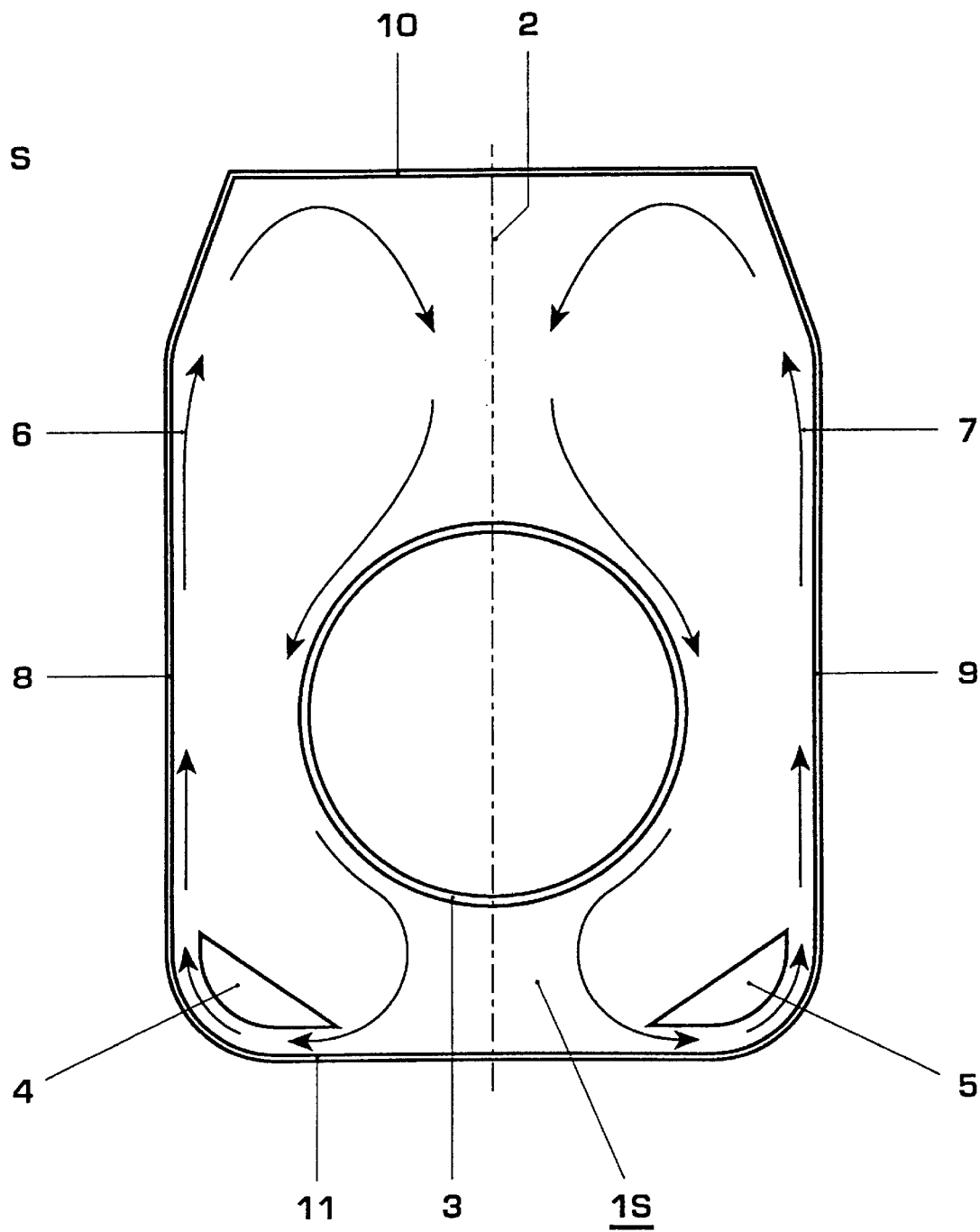
Figure 3:
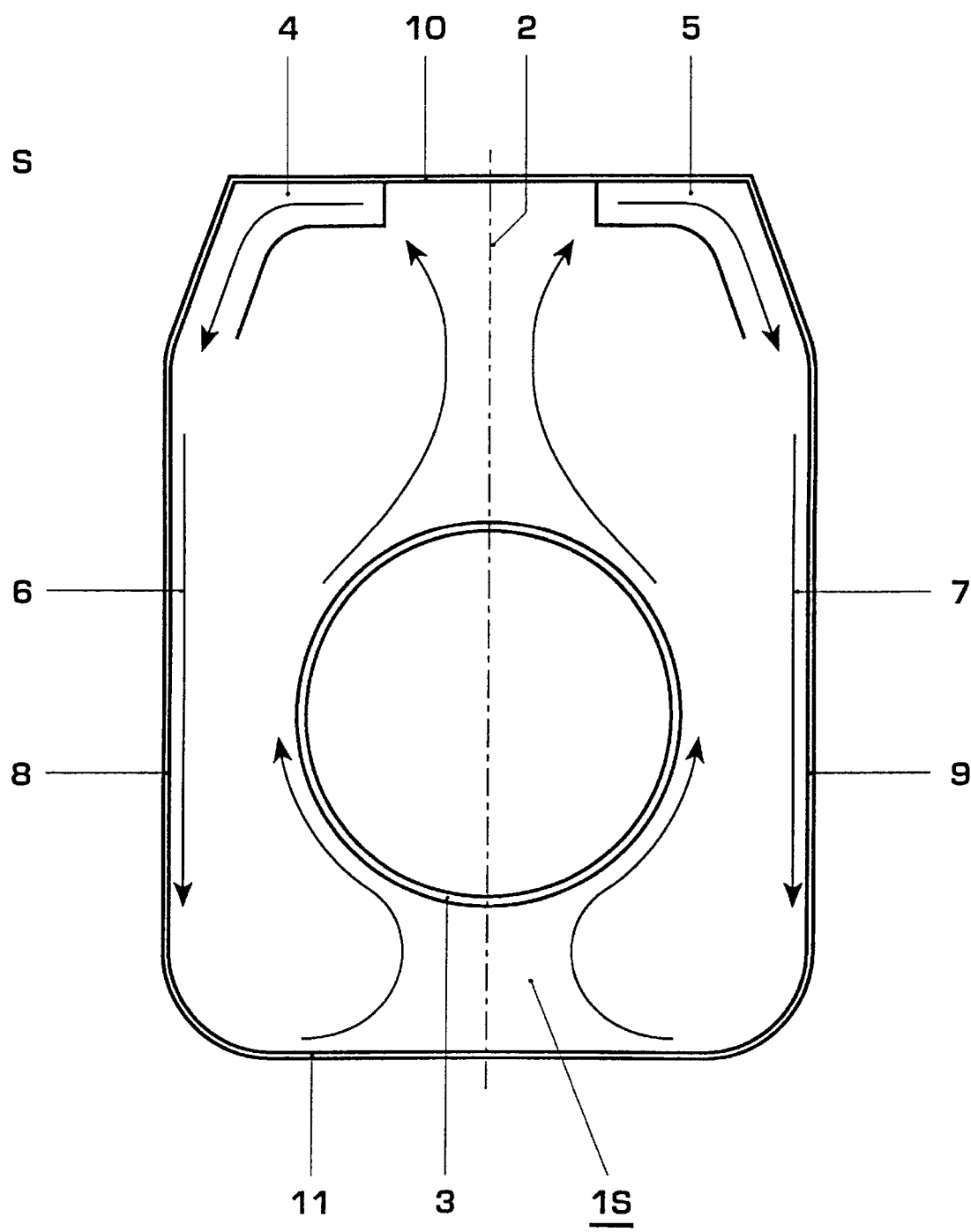

In all the figures, identical reference symbols also designate parts with an identical action. FIGS. 1 to 3 in each case illustrate a switch pole, assigned to a phase S of a three-phase high-voltage system, of a generator switch. The switch pole has a preferably metallic housing 1S, preferably at earth potential, with a box-like profile, which is of essentially mirror-symmetrical design. The associated plane of symmetry 2 extends perpendicular to the plane of the drawing and is at the same time also the plane of symmetry for a hollow-cylindrical conductor 3 which is of predominantly symmetrical design. The conductor 3 is held on supporting insulators (not illustrated), forming an electrical insulation spacing from the housing, and is led upwards and downwards perpendicular to the plane of the drawing.

The conductor 3 typically carries operating currents from 5 to 30 kA at operating voltages from 10 to 36 kV. Because of purely resistive losses, which can be considerable, in particular at contact transitions, the conductor 3 heats up considerably. The heat formed in the conductor is given off to the housing 1S via natural convection and radiation. In order to promote the dissipation of heat by convection, two flow sources, each designed as linearly acting blowers 4, 5, are contained in the housing 1S, being arranged and designed in such a way that, during the operation of the system, two mirror-symmetrical circulation part flows 6 and 7 are formed which are bounded by the plane of symmetry 2. These circulation part flows 6 and 7 are in each case guided along one side wall 8 and 9, respectively, predominantly without recirculation, from the top 10 of the housing 1S to its bottom 11, and rise from there, as a result of natural convection and the action of the blower 4 and 5, parallel to the plane of symmetry 2 to the conductor 3, flow around the left-hand and right-hand side surface of the said conductor, picking up heat loss, and are led back to the top 10, from where they pass again to the blowers 4, 5 along the housing walls (top 10, side wall 8 or 9 and bottom 11), giving up the heat picked up.

The use of the blowers 4, 5 increases the transfer of heat from the conductor 3 to the housing 1S. The conductor 3 can therefore be loaded with higher currents. It is merely necessary to ensure that the temperature of the housing does not rise too severely.

The freedom from recirculation of the circulation part flows 6 and 7 is achieved, in the embodiment according to FIG. 1, by the two blowers 4 and 5 being fixed to opposite ends of the bottom 11 of the housing, and by there being flow guide surfaces 12 and 13 provided on the side walls 8 and 9 coming from the respective ends. Without these precautions, the circulation part flows 6 and 7 would for the most part be led downwards again before reaching the top 10 of the housing (flow arrows 14 indicated dashed), and in this way the cooling action of the top 10 of the housing and of the housing side walls 8, 9 could not be used completely.

In the embodiment according to FIG. 2, the blowers 4 and 5 arranged at opposite ends of the bottom of the housing produce circulation part flows 6 and 7, respectively, directed counter to the natural convection. Heat given up by the conductor is then led downwards by the circulation part flows 6 and 7, which initially fall, and is then led upwards by the blowers 4 and 5 to the housing side walls 8 and 9. In the process, the gas carried in the circulation part flows 6, 7 is cooled down. Means which prevent recirculation, such as the flow guide surfaces 12 and 13 in the embodiment according to FIG. 3, can thus be dispensed with.

In the embodiment according to FIG. 3, the blowers 4 and 5 are fixed to the top 10 of the housing and produce the circulation part flows 6 and 7 assisting the natural convection. In the same way as in the embodiment according to FIG. 2, means preventing recirculation can also be dispensed with here, but here there is the additional advantage that, because of the action of the circulation part flows 6 and 7 in assisting convection, the two blowers can be operated with a low energy consumption.

Figure 4:
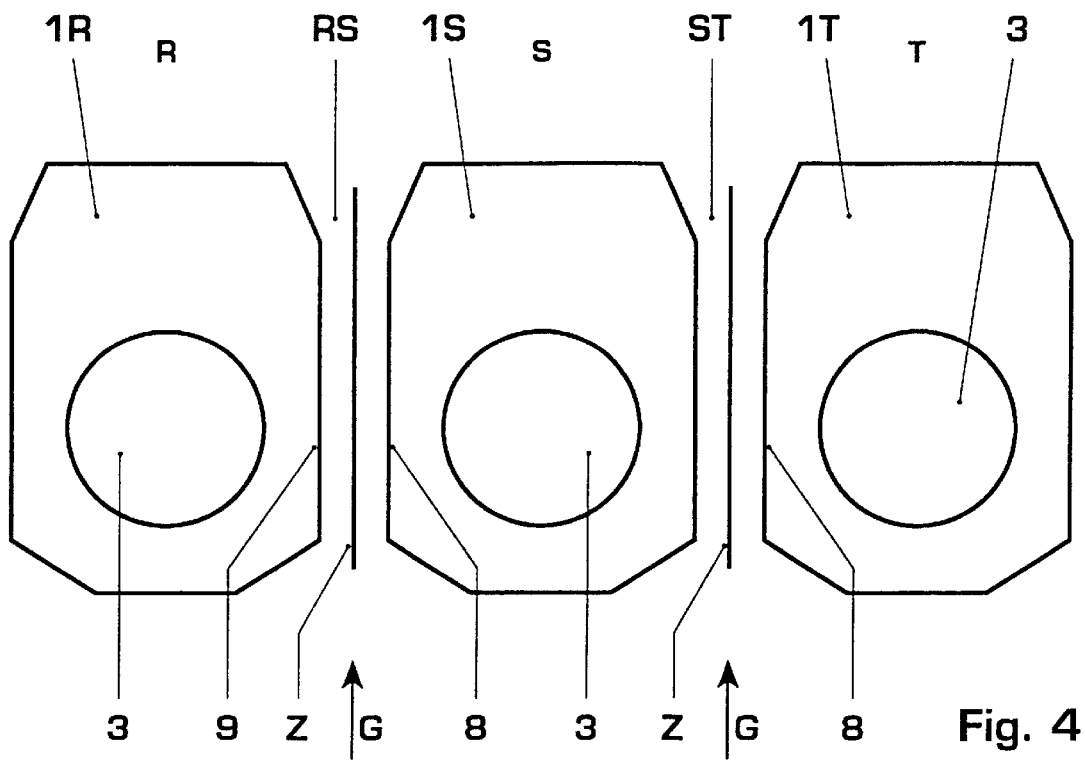

The single-phase system sections illustrated in FIGS. 1 to 3 can advantageously be used as the central phase S of a system section of three-phase design and having the phases R, S and T. In this section of a system, illustrated in FIGS. 4 and 5, the housings 1R, 1S and 1T assigned to the individual phases are arranged at a distance from one another, forming vertically aligned channels RS and ST, and the blowers (not illustrated in the two FIGS. 4 and 5) are arranged in the central housing 1S of the three. The heat led to the housing side walls 8 and 9 of the housing 1S is led away by the chimney effect of the channels RS and ST. In addition, an intermediate wall Z led parallel to the bounding side walls 9 and 8 of the adjacent housings 1R and 1S and, respectively, 1S and 1T can be arranged in the channel RS and ST, respectively. No losses are produced in this intermediate wall, and it is thus possible for a temperature difference to be established between the housing side wall 9 and 8 or 9 and 8 and the intermediate wall Z. Radiation energy can thus be given up to the intermediate wall Z by the housing side walls 8 and 9. The intermediate wall heated by the radiation energy is cooled by means of free convection of the surrounding air. The additional heat dissipation is up to about 10% of the total heat loss if the intermediate wall Z —as FIG. 4 reveals —is arranged in the center between the two housing side walls 9 and 8 and is merely of smooth design. The intermediate wall is advantageously thermally conductively connected to the housing, for example 1S, or is even an integral component of the housing.

Figure 5:
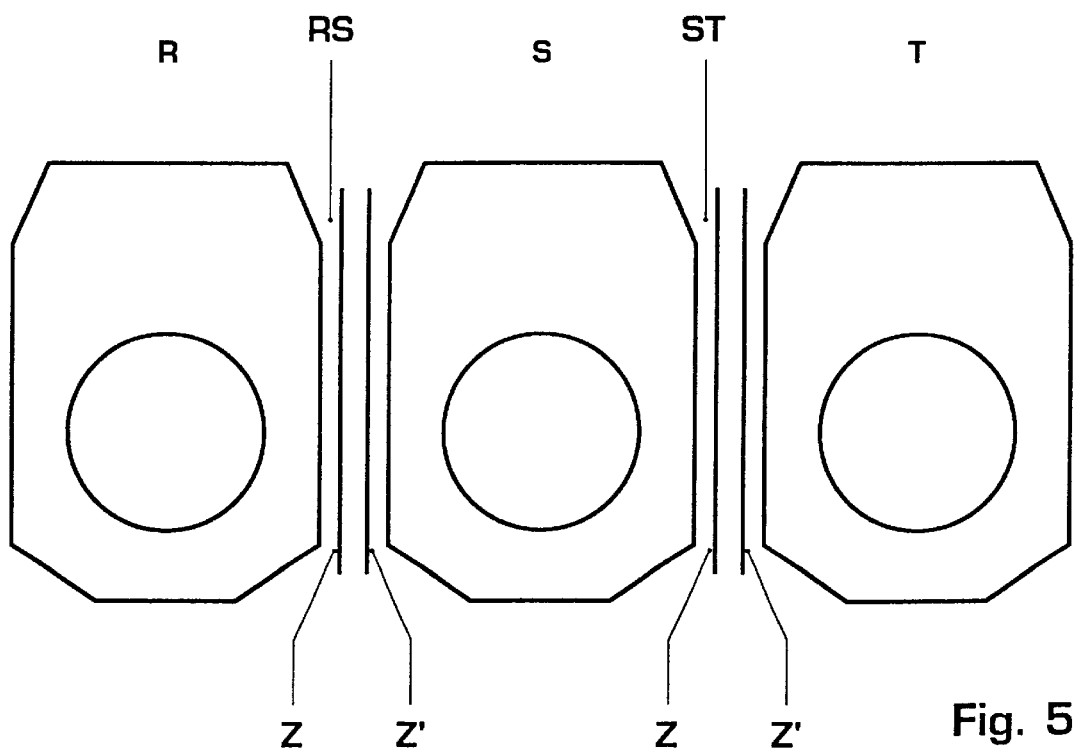

As can be seen from FIG. 5, in a further embodiment of the section of the system according to the invention, a further intermediate wall Z' can be arranged parallel to the intermediate wall Z. In this embodiment, the dissipation of heat to the convection flow is additionally increased. In order to achieve even better dissipation of heat, the two intermediate walls should be joined by longitudinal ribs led vertically.

Figure 6:
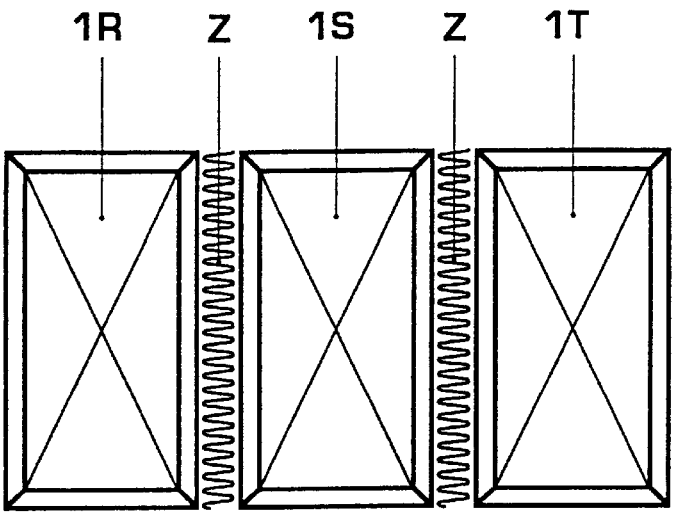
Figure 7:
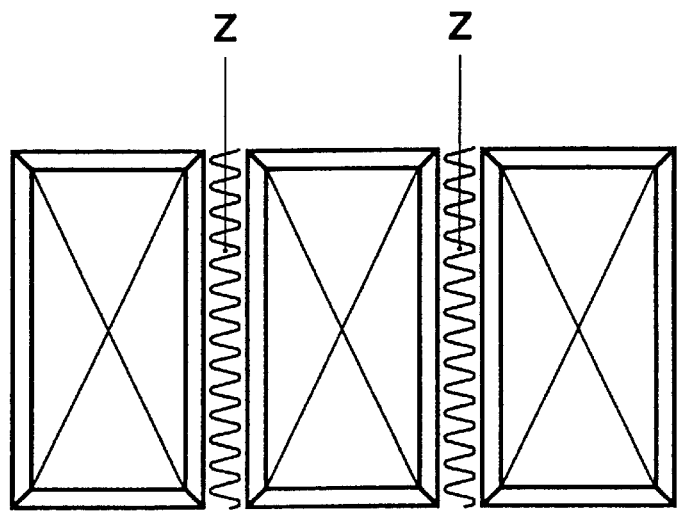
Figure 8:
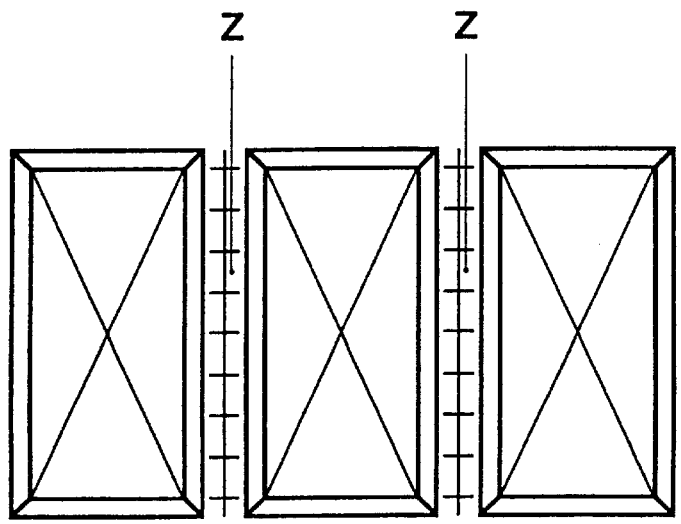

In the embodiments revealed by FIGS. 6 to 8, the intermediate wall has means for enlarging its surface area, by means of which the dissipation of heat to the natural convection flow is additionally improved. Such means advantageously comprise an intermediate wall Z with a corrugated structure. The structure forms extraction channels led vertically for the convection flow and contains waves, which can be of narrow (FIG. 6) or wide (FIG. 7) design, or else longitudinal ribs (FIG. 8). In order not to hamper the free convection flow, the housings 1R and 1S and 1S and 1T should have a minimum spacing from one another.

In addition, the dissipation of heat can be improved by a flow led forcibly through one of the channels RS or ST. For this purpose an external blower producing this forced flow, or two or even more external blowers producing this forced flow, can be provided. Such an external blower is illustrated symbolically as an arrow in FIG. 4 and is provided with the reference symbol G.

What is claimed is:

1. In a section of an electrical high-voltage system, having a gas-filled housing of predominantly symmetrical design, a conductor extending along the plane of symmetry in the housing, and having cooling means for producing a circulation flow which dissipates heat loss from the conductor, the cooling means comprising at least one flow source and in that the at least one flow source is arranged in the interior of the housing and is designed in such a way that, during the operation of the system, two mirror-symmetrical circulation part flows are formed which are bounded by the plane of symmetry and which are in each case guided without recirculation along a first housing wall from a second housing wall, which is intersected by the plane of symmetry, to a third housing wall, which is intersected by the plane of symmetry.

2. Section of a system according to claim 1, wherein two flow sources are provided, each of which is assigned to one of the circulation part flows.

3. Section of a system according to claim 2, wherein the plane of symmetry is aligned predominantly vertically, and the first housing wall is a side wall, the second housing wall is a top and the third housing wall is a bottom of the housing.

4. Section of a system according to claim 3, wherein the two flow sources are fixed to opposite ends of the bottom of the housing, and flow guide surfaces are provided at the two housing side walls coming from the two ends.

5. Section of a system according to claim 3, wherein the flow sources are fixed to the opposite ends of the top of the housing or the bottom of the housing.

6. Section of a system according to claim 1, said section having at least three housings which each accommodate a conductor and which are arranged beside one another at housing side walls, wherein the housings are arranged at a distance from one another, forming vertically aligned channels, and the at least one flow source is arranged in the central housing of the three.

7. Section of a system according to claim 6, wherein in at least one of the channels there is arranged a first intermediate wall which is led parallel to the bounding side walls of the adjacent housings.

8. Section of a system according to claim 7, wherein the first intermediate wall has means for enlarging its surface area.

9. Section of a system according to claim 8, wherein the means for enlarging the surface area comprise corrugations led vertically and/or longitudinal ribs.

10. Section of a system according to claim 7, wherein in the at least one channel there is arranged a second intermediate wall led parallel to the first intermediate wall.

11. Section of a system according to claim 10, wherein the first and second intermediate walls are joined by longitudinal ribs led vertically.

12. Section of a system according to claim 6. wherein at least one flow source serving to produce gas flow in the channels is provided.

* * * * *